(12) United States Patent
Eschl et al.

(10) Patent No.: US 11,407,184 B2
(45) Date of Patent: Aug. 9, 2022

(54) METHOD FOR PRODUCING AN SMC COMPONENT PROVIDED WITH A UNIDIRECTIONAL FIBER REINFORCED

(71) Applicant: Bayerische Motoren Werke Aktiengesellschaft, Munich (DE)

(72) Inventors: Johannes Eschl, Groebenzell (DE); Markus Reiss, Munich (DE); Holger Stute, Landshut (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 654 days.

(21) Appl. No.: 15/420,553

(22) Filed: Jan. 31, 2017

(65) Prior Publication Data

US 2017/0136714 A1 May 18, 2017

Related U.S. Application Data

(63) Continuation of application No. PCT/EP2015/067129, filed on Jul. 27, 2015.

(30) Foreign Application Priority Data

Aug. 12, 2014 (DE) ...................... 10 2014 215 964.4

(51) Int. Cl.
*B29C 70/18* (2006.01)
*B29C 70/46* (2006.01)
(Continued)

(52) U.S. Cl.
CPC ............ *B29C 70/18* (2013.01); *B29C 70/081* (2013.01); *B29C 70/083* (2013.01);
(Continued)

(58) Field of Classification Search
CPC ......... B29C 70/18; B29C 70/23; B29C 70/46; B29C 70/345; B29C 70/342; B29C 70/44;
(Continued)

(56) References Cited

U.S. PATENT DOCUMENTS 4,526,195 A  7/1985 Humphrey et al.
4,784,920 A  11/1988 Machida
(Continued)

FOREIGN PATENT DOCUMENTS

CN  103260843 A  8/2013
DE  34 45 462 A1  10/1985
(Continued)

OTHER PUBLICATIONS

Chinese-language Office Action issued in counterpart Chinese Application No. 201580023342.8 dated Apr. 28, 2018 with English translation (thirteen (13) pages).

(Continued)

*Primary Examiner* — Armand Melendez
(74) *Attorney, Agent, or Firm* — Crowell & Moring LLP

(57) ABSTRACT

A method is provided for producing an SMC component provided with a unidirectional fiber reinforced. The method includes: a) a blank of a unidirectional fiber reinforced is laid on the tool surface of a lower part of a preform tool, b) the preform tool is closed by moving a preform upper part and the preform lower part of the preform tool towards each other, thus forming the unidirectional fiber reinforced; c) the unidirectional fiber reinforced is pre-cured in the preform tool by heating; d) the removed unidirectional fiber reinforced together with at least one nondirectional SMC semi-finished product are laid in a press tool, onto the tool surface of a press tool lower part; e) the press tool is closed, wherein a press tool upper part and the press tool lower part of the press tool are moved towards each other to mold together the unidirectional fiber reinforced and the at least one nondirectional SMC semi-finished product; and f) the produced SMC component is fully cured by heating.

11 Claims, 3 Drawing Sheets

(51) Int. Cl.
*B29C 70/08* (2006.01)
*B29C 70/34* (2006.01)
*B29K 63/00* (2006.01)
*B29K 105/08* (2006.01)
*B29K 105/12* (2006.01)
*B29K 309/08* (2006.01)

(52) U.S. Cl.
CPC ............ *B29C 70/345* (2013.01); *B29C 70/46* (2013.01); *B29K 2063/00* (2013.01); *B29K 2105/0863* (2013.01); *B29K 2105/12* (2013.01); *B29K 2309/08* (2013.01)

(58) Field of Classification Search
CPC ... B29C 70/545; B29C 70/081; B29C 70/083; B29C 70/085; B29C 70/86; B29C 70/34; B29C 70/465; B29C 70/506; B29C 70/508; B29C 70/541; B29C 70/543; B29C 70/78; B29C 70/887; B29C 43/36; B29C 2043/3665; B29C 2043/02; B29C 2043/203; B29C 2043/42; B29C 33/0033; B29C 35/02; B29C 51/08; B29C 51/145; B29C 53/04; B29C 64/241; B29K 2105/0863; B29K 2307/04; B29K 2101/10; B29K 2063/00; B29K 2071/00; B29K 2081/04; B29K 2101/12; B29K 2105/0067; B29K 2105/06; B29K 2105/08; B29K 2105/0854; B29K 2105/0872; B29K 2105/12; B29K 2309/08; B29K 2995/0002; B29K 2995/0015
See application file for complete search history.

(56) References Cited

U.S. PATENT DOCUMENTS

| | | | |
|---|---|---|---|
| 5,044,918 A | 9/1991 | Bruessel | |
| 5,490,892 A * | 2/1996 | Castagnos | ........... B29C 37/0082 156/89.26 |
| 5,783,132 A | 7/1998 | Matsumoto et al. | |
| 7,419,628 B2 * | 9/2008 | Westerlund | ............. B29C 33/12 264/259 |
| 2005/0253294 A1 * | 11/2005 | Takano | .................... B29C 70/34 264/138 |
| 2006/0216462 A1 | 9/2006 | Lucas et al. | |
| 2007/0152380 A1 * | 7/2007 | Muller | .................. B29C 45/045 264/516 |
| 2012/0038081 A1 * | 2/2012 | Kendall | ................. B29C 70/465 264/257 |
| 2013/0099405 A1 * | 4/2013 | Kraemer | ................. B29C 70/48 264/40.1 |
| 2014/0212624 A1 | 7/2014 | Ayuzawa | |
| 2014/0378582 A1 * | 12/2014 | Masini | .................... B29C 70/44 523/468 |
| 2015/0336304 A1 * | 11/2015 | Bosg | ...................... B29C 33/14 428/209 |

FOREIGN PATENT DOCUMENTS

| | | |
|---|---|---|
| DE | 37 15 120 A1 | 11/1987 |
| DE | 38 42 660 A1 | 6/1990 |
| DE | 199 49 318 A1 | 3/2001 |
| DE | 10 2011 012 499 A1 | 8/2012 |
| DE | 11 2012 003 671 T5 | 7/2014 |
| EP | 1 535 726 A1 | 6/2005 |
| EP | 1 705 277 A1 | 9/2006 |
| WO | WO 2013/128312 A1 | 9/2013 |

OTHER PUBLICATIONS

International Search Report (PCT/ISA/210) issued in PCT Application No. PCT/EP2015/067129 dated Dec. 18, 2015 with English translation (Six (6) pages).

German-language Written Opinion (PCT/ISA/237) issued in PCT Application No. PCT/EP2015/067129 dated Dec. 18, 2015 (Six (6) pages).

German-language Search Report issued in counterpart German Application No. 10 2014 215 964.4 dated Mar. 25, 2015 with partial English translation (Eleven (11) pages).

* cited by examiner

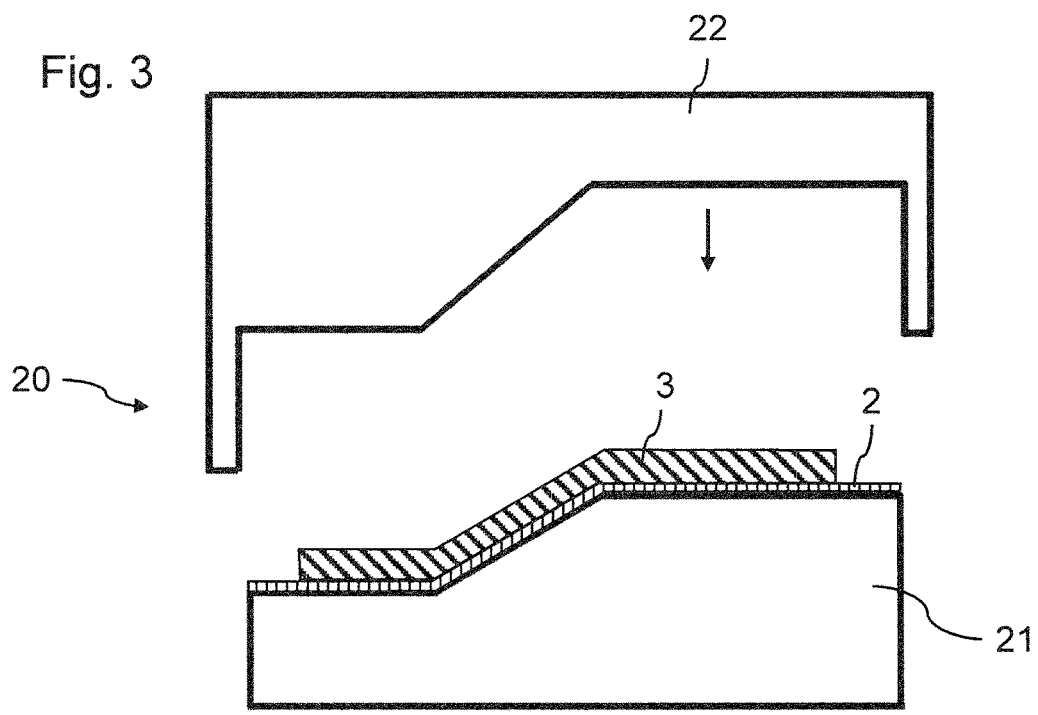
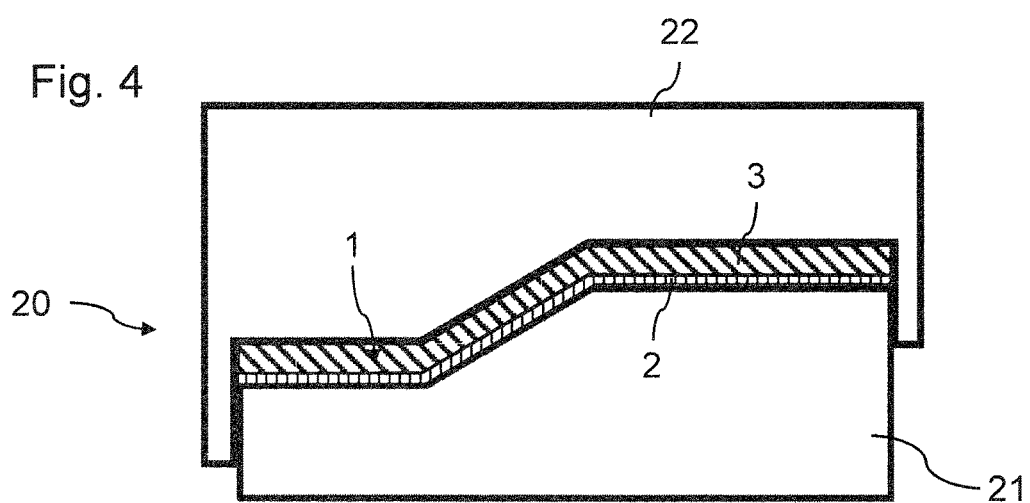

METHOD FOR PRODUCING AN SMC COMPONENT PROVIDED WITH A UNIDIRECTIONAL FIBER REINFORCED

CROSS REFERENCE TO RELATED APPLICATIONS

This application is a continuation of PCT International Application No. PCT/EP2015/067129, filed Jul. 27, 2015, which claims priority under 35 U.S.C. § 119 from German Patent Application No. 10 2014 215 964.4, filed Aug. 12, 2014, the entire disclosures of which are herein expressly incorporated by reference.

BACKGROUND AND SUMMARY OF THE INVENTION

The present invention relates to a method for producing an SMC component provided with a unidirectional fiber reinforced.

A Sheet Molding Compound (SMC) is a planar semi-finished product of cross-linkable resins, fibers, in part mineral fillers, and additives. Components produced from SMCs have been employed on an industrial scale for many years. For example, SMC components are employed in the automotive and the construction industry as well as in infrastructure projects. The composition is readily adaptable to customer requirements, so that heavy specialization and special niche markets have been created. SMC semi-finished products are processed on hydraulic press tools. Although higher degrees of deformation prevail, there is a similarity to sheet-metal forming.

Employing unidirectional fiber reinforcements (UD fiber reinforcements) in the SMC method is likewise known. A unidirectional fiber reinforced is a layer from a fiber-plastics composite in which all fibers are oriented in a single direction. In relation to non-oriented fiber-reinforced semi-finished products, UD fiber reinforceds have processing characteristics that differ significantly.

Insert-pressing of unidirectional fiber reinforceds in press tools, using SMC semi-finished products, is furthermore known. However, the dissimilar processing characteristics of the unidirectional fiber reinforced and the at least one SMC semi-finished product herein are disadvantageous. Placing, especially of the unidirectional fiber reinforced, or of the fibers, in the SMC component, respectively, is controllable only with difficulty due to the flow behavior of the unidirectional fiber reinforced, which is significantly different from that of the SMC semi-finished product. Complex preparations have to be made in press-molding in order for the desired position of the unidirectional fiber reinforced in relation to the SMC semi-finished product to be approximately achieved.

It is therefore the object of the present invention to at least in part eliminate the disadvantages as have been described above in the production of an SMC component provided with a unidirectional fiber reinforced. It is the object of the present invention to, in particular, make available a method for producing an SMC component provided with a unidirectional fiber reinforced, in which method process-reliable placing of the unidirectional fiber reinforced in the SMC component being created is enabled, and thus the desired and defined component characteristics of the finished SMC component are enabled.

The object mentioned above is achieved by a method for producing an SMC component provided with a unidirectional fiber reinforced, in accordance with embodiments of the invention, and by an SMC component so produced. It is self-evident herein that features and details that are described in the context of the method also apply in the context of the SMC component according to the invention, and vice versa, so that in terms of the disclosure of the individual aspects of the invention, reciprocal reference is or may be made at all times, respectively. In particular, the SMC component according to the invention may be produced using the method according to the invention.

This means that the object mentioned above is achieved by a method for producing an SMC component provided with a unidirectional fiber reinforced, wherein the method is characterized by the following method acts:

a) placing a blank of a unidirectional fiber reinforced on the tool surface of a lower part of a preform tool;

b) closing the preform tool in that a preform upper part and the preform lower part of the preform tool are converged, wherein the unidirectional fiber reinforced is shaped;

c) pre-curing the unidirectional fiber reinforced in the preform tool by heating, and retrieving the pre-cured unidirectional fiber reinforced from the preform tool after a predetermined time has elapsed;

d) laying up the retrieved unidirectional fiber reinforced together with at least one non-oriented SMC semi-finished product on the tool surface of a press-tool lower part in a press tool;

e) closing the press tool, wherein a press-tool upper part and the press-tool lower part of the press tool are converged for press-molding the unidirectional fiber reinforced and the at least one non-oriented SMC semi-finished product; and f) curing the produced SMC component by heating.

The method steps a) to f) herein are performed in temporal succession.

A blank of a unidirectional fiber reinforced is first placed on the tool surface of a lower part of a preform tool. The blank may be of any shape possible. In particular, the blank is a planar structure. The fibers of the fiber reinforced are of unidirectional orientation, that is to say that all fibers in the fiber reinforced are oriented in a single direction. The tool surface of the lower part of the preform tool has that shape that the unidirectional fiber reinforced is to assume before the latter, together with at least one SMC semi-finished product, is to be press-molded into an SMC component. Once the unidirectional fiber reinforced is deposited on the tool surface of the lower part of the preform tool, the preform tool is closed. The tool surface of the upper part of the preform tool is preferably configured so as to be complementary to the tool surface of the lower part of the preform tool. On account thereof, the unidirectional fiber reinforced is press-molded into the desired final contour at a uniform thickness throughout, when the preform tool is closed. The unidirectional fiber reinforced is pre-cured in the preform tool by heating either after or already prior to the unidirectional fiber reinforced being press-molded. The heat transfer to the unidirectional fiber reinforced herein is advantageously performed directly by way of the upper and lower part of the preform tool. The parts may be heated such that the heat of the preform tool is transferred to the unidirectional fiber reinforced. The temperature on the tool surface of the preform-tool parts is preferably between 100° and 150° C., in particular between 120° and 130°. The unidirectional fiber reinforced is heated to a maximum of 180°. As an alternative to heating the unidirectional fiber reinforced in the preform tool, heating of the unidirectional fiber reinforced outside the preform tool is also contemplated.

Apart from being determined by temperature, the degree of pre-curing of the unidirectional fiber reinforced is determined by the time period of heating. This means that the longer the unidirectional fiber reinforced is heated in the preform tool, the more the unidirectional fiber reinforced is cured throughout. Preferably, the unidirectional fiber reinforced is heated for half a minute, or for approx. half a minute per millimeter of thickness of the fiber reinforced. This means that a unidirectional fiber reinforced of 10 mm thickness is heated for 5 minutes so as to achieve the desired pre-curing. Additionally, the time period of heating of the unidirectional fiber reinforced depends on the type of the matrix system.

The unidirectional fiber reinforced during heating is preferably heated in such a manner that the unidirectional fiber reinforced is not completely cured throughout, since the unidirectional fiber reinforced during subsequent press-molding can otherwise not be connected to the at least one SMC semi-finished product in an optimal manner.

Once the predetermined time has elapsed, the correspondingly pre-cured unidirectional fiber reinforced is retrieved from the preform tool and, together with at least one non-oriented SMC semi-finished product, laid up on the tool surface of a press-tool lower part in a press tool. The press tool may be a tool that is separate from the preform tool. Alternatively, the preform tool per se may represent the press tool. In the case of the latter, the pre-cured unidirectional fiber reinforced, prior to press-molding with at least one SMC semi-finished product, may be left in the preform tool.

Preferably, one or a plurality of non-oriented SMC semi-finished products are placed on the unidirectional fiber reinforced that has already been laid up in the press tool. This means than non-oriented SMC semi-finished products are brought to bear on only one side of the unidirectional fiber reinforced. This is also referred to as non-symmetrical insert pressing of the unidirectional fiber reinforced in the press tool.

In the context of the invention, SMC semi-finished products are planar semi-finished products from cross-linkable resins and fibers, that is to say that SMC semi-finished products are produced from a highly viscous fiber-resin composite. Additionally, mineral fillers and additives may form part of an SMC semi-finished product. The viscosity of the fiber-resin mass decreases in further processing in the case of a closed press tool under heat and pressure. The fibers may be short and long fibers.

The SMC semi-finished product, prior to being processed with the unidirectional fiber reinforced in the hot-pressing method in the press tool, is preferably present as board material. The additive materials, mineral fillers, for example, prevent the matrix adhering to the tool surface of the press-tool lower part, or of the press-tool upper part, respectively, and in this way render the SMC semi-finished product manageable. Polyester or vinyl resins are typically used as resins. Glass fibers may be used as fibers, for example. Alternatively, carbon fibers, basalt fibers, or other fibers may be used as fibers. If and when the SMC semi-finished product is partly composed of carbon fibers, epoxy resins are preferably used as a resin. Additive materials may be mineral fillers such as chalk or rock flour. Additional additives serve for reducing shrinkage. Additionally, form-release agents which during heating of the SMC semi-finished product in the press tool migrate to the surface of the SMC semi-finished product in order for the latter to be more easily removable from the press tool at the end of the pressing procedure may be provided in an SMC semi-finished product.

After the unidirectional fiber reinforced and the at least one non-oriented SMC semi-finished product have been laid up on the tool surface of the press-tool lower part, the press tool is closed, and the structure from the unidirectional fiber reinforced and the non-oriented SMC semi-finished product is cured under heat so as to form an SMC component. In order for the SMC component to be cured, the SMC component is preferably heated at a temperature between 140° and 160° C., in particular at a temperature of about 150° C. The time period of heating depends on the thickness of the SMC component.

Process-reliable placing of the unidirectional fiber reinforced in the press tool and thus in relation to the at least one non-oriented SMC semi-finished product may be performed by the method according to the invention. A desired and defined component characteristic of the produced SMC component may be achieved by the optimal placing of the unidirectional fiber reinforced in the press tool, and by the associated optimal bearing of the unidirectional fiber reinforced on the non-oriented SMC semi-finished product. The SMC component produced by the method has significantly fewer variations in the component characteristics such as in mechanical component characteristics or in warpage, for example, than is the case with SMC components in which the unidirectional fiber reinforced, prior to press-molding with at least one non-oriented SMC semi-finished product, has not previously been pre-shaped and pre-cured in a preform tool. The SMC component produced by this method has a dimensional stability with less variation than conventionally produced SMC components with unidirectional fiber reinforcements. On account of the unidirectional fiber reinforced being pre-cured and pre-shaped, the former during subsequent press-molding is able to better connect to the at least one non-oriented SMC semi-finished product. Positioning of the fibers of the unidirectional fiber reinforced during press-molding with the non-oriented SMC semi-finished product is significantly better controllable than a non-pre-shaped and pre-cured unidirectional fiber reinforced. That is to say that significantly fewer preparations are required in order for the optimal position of the unidirectional fiber reinforced in relation to the at least one SMC semi-finished product to be guaranteed during press-molding when the unidirectional fiber reinforced is press-molded with the at least one SMC semi-finished product.

According to one preferred refinement of the invention, it may be provided in a method that in step d) the unidirectional fiber reinforced is first laid up on the tool surface of the press-tool lower part in the press tool, and subsequently the at least one SMC semi-finished product is placed on the unidirectional fiber reinforced. The unidirectional fiber reinforced and the tool surface of the press-tool lower part preferably have identical contours. On account thereof, the unidirectional fiber reinforced is held on the tool surface of the press-tool lower part in a form-fitting manner. This form-fitting hold of the unidirectional fiber reinforced ensures that the unidirectional fiber reinforced has an optimal flow behavior in relation to the flow behavior of the SMC semi-finished product during the subsequent press-molding of the at least one SMC semi-finished product with the unidirectional fiber reinforced. In particular, the flow behavior of the unidirectional fiber reinforced is significantly better controllable than in the case of a non-pre-shaped and pre-cured unidirectional fiber reinforced. In this method, the at least one non-oriented SMC semi-finished product is press-molded with the unidirectional fiber reinforced on one side of the latter.

As has been mentioned above, it is advantageous for the unidirectional fiber reinforced to be held on the tool surface of the press-tool lower part of the press tool in a form-fitting manner. On account thereof, the flow behavior of the fibers of the unidirectional fiber reinforced may be readily controlled or managed, respectively. Alternatively or additionally, the unidirectional fiber reinforced may be held on the tool surface of the press-tool lower part in a materially integral manner. In particular, the unidirectional fiber reinforced may be adhesively bonded to the tool surface. On account thereof, slipping of the unidirectional fiber reinforced during press-molding with the at least one SMC semi-finished product is prevented.

It may furthermore be provided in a method that in step d) the at least one SMC semi-finished product is first laid up on the tool surface of the press-tool lower part in the press tool, and subsequently the unidirectional fiber reinforced is placed on the at least one SMC semi-finished product. The unidirectional fiber reinforced may in this case be secured on, in particular adhesively bonded to, the tool surface of the press-tool upper part, for example.

According to one particularly preferred refinement of the invention, it may be provided in a method that at least one further SMC semi-finished product is placed onto that side of the unidirectional fiber reinforced that faces away from the tool surface of the press-tool lower part. This means that the unidirectional fiber reinforced is surrounded on both sides by an SMC semi-finished product. On account thereof, the unidirectional fiber reinforced during press-molding in the press tool is insert-pressed on all sides by an SMC semi-finished product. Depending on the requirements, it is possible that SMC semi-finished products having dissimilar thicknesses are brought to bear on both sides of the unidirectional fiber reinforced. However, it is preferable for SMC semi-finished products of identical thickness and with identical characteristics to be brought to bear on both sides of the unidirectional fiber reinforced such that, after press-molding in the press tool, an SMC component having a homogenous component characteristic is produced.

The surfaces of the fiber reinforced connect to the surfaces of the SMC semi-finished product during press-molding of the unidirectional fiber reinforced with the at least one non-oriented SMC semi-finished product and during subsequent heating of the structure. That is to say that upon completion of the method, the at least one non-oriented SMC semi-finished product adheres to the unidirectional fiber reinforced. In order for even better adhesion between the unidirectional fiber reinforced and the at least one non-oriented SMC semi-finished product to be achieved, it may be provided in a method that the surface of the unidirectional fiber reinforced is treated, in particularly roughened, prior to the unidirectional fiber reinforced being laid up together with the at least one non-oriented SMC semi-finished product in the press tool. For example, for roughening, the surface of the fiber reinforced may be sand-blasted.

According to one preferred refinement of the invention, it may furthermore be provided in a method that the unidirectional fiber reinforced is held on the press-tool lower part and/or on the press-tool upper part in the press tool by at least one positioning element. On account thereof, the unidirectional fiber reinforced may be placed in the press tool in an optimal manner and be better held in the pressing procedure. In this way, the at least one positioning element may be a purely geometric guide, for example, such as a rib or a protrusion, for example, on the tool surface of the press-tool lower part and/or of the press-tool upper part.

It may furthermore be provided in a method that at least one positioning element is deployable from the tool surface of the press-tool lower part, and/or at least one positioning element is deployable from the tool surface of the press-tool upper part. The positioning elements, in particular in the case of dual-sided insert-pressing of the unidirectional fiber reinforced by the non-oriented SMC semi-finished product, enable the unidirectional fiber reinforced to be secured in the press tool prior to the actual commencement of the pressing procedure. The deployable positioning elements are in particular disposed on the press-tool lower part and on the press-tool upper part in such a manner that each pair of positioning elements is disposed so as to be mutually aligned when the press tool is being closed. On account thereof, one positioning element of the press-tool lower part, and one positioning element of the press-tool upper part each clamp the unidirectional fiber reinforced therebetween. The non-oriented SMC semi-finished product is placed in a plurality of parts between the positioning elements. The positioning elements are retracted at the commencement of the mutual pressing of the non-oriented SMC semi-finished pieces and of the unidirectional fiber reinforced, so that the intermediate spaces that have been created by the positioning elements are also filled with SMC semi-finished product during press-molding. The positioning elements are preferably configured as deployable pins. Upon completion of the retraction of the positioning elements, the end sides of the free ends of the positioning elements preferably run so as to be planar with the tool surfaces of the press-tool lower part or of the press-tool upper part, respectively.

Therefore, a method which is characterized by the following sequential method acts is particularly preferable:

at least two non-oriented SMC semi-finished products are laid up beside and/or between at least one positioning element on the tool surface of the press-tool lower part in the press tool;

the unidirectional fiber reinforced, which has previously been pre-shaped and pre-cured in a preform tool, thereafter is brought to bear on the at least one positioning element and/or on the at least two non-oriented SMC semi-finished products;

at least one further SMC semi-finished product is placed onto the unidirectional fiber reinforced on that side of the unidirectional fiber reinforced that faces away from the tool surface of the press-tool lower part, wherein at least one region of the unidirectional fiber reinforced for passing through at least one positioning element of the press-tool upper part is not occupied;

the press tool subsequently is closed to such an extent that the unidirectional fiber reinforced is secured by the positioning elements;

the press tool for partial press-molding of the unidirectional fiber reinforced and of the SMC semi-finished products is closed further after the unidirectional fiber reinforced has been secured;

the positioning elements are retracted up to the tool surface of the respective press-tool parts prior to the desired nominal wall thickness of the SMC component being reached; and the press tool is subsequently closed so far until the desired nominal wall thickness of the SMC component which is created by press-molding the unidirectional fiber reinforced and the SMC semi-finished products is reached; and the produced SMC component during and at the end of press-molding is cured by heating.

A process-reliable placing of the unidirectional fiber reinforced between the SMC semi-finished product can be achieved by a method of this type. On the one hand, the positioning elements ensure optimal positioning of the unidirectional fiber reinforced in the press tool; on the other hand, the positioning elements guarantee a footing for the SMC semi-finished products. It is furthermore enabled by the displaceability of the positioning elements that at the end of press-molding the intermediate spaces between the SMC semi-finished products that previously had been filled by the positioning elements may be embodied by SMC semi-finished product. On account thereof, it is ensured that the unidirectional fiber reinforced at the end of press-molding is completely surrounded by SMC semi-finished product. The component characteristic of the SMC component produced by way of this method is homogenous in the entire SMC component. Significantly fewer variations in the component characteristics arise as compared to conventionally produced SMC components.

According to a second aspect of the invention, the object is achieved by an SMC component which has been produced by one of the methods as described above. Herein, the same advantages as have been described in detail in the context of the method according to the invention apply to the SMC component.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 schematically shows a shaped and pre-cured unidirectional fiber reinforced and a non-oriented SMC semi-finished product, which are laid up on the tool surface of a press-tool lower part in a press tool.

FIG. 4 schematically shows a closed press tool in which the unidirectional fiber reinforced and the non-oriented SMC semi-finished product are mutually press-molded and cured.

Elements having identical functions and functional modes are in each case provided with the same reference sign in FIGS. 1 to 7.

DETAILED DESCRIPTION OF THE DRAWINGS

A method for producing an SMC component 1 provided with a unidirectional fiber reinforced 2 is shown in FIGS. 1 to 4, wherein an SMC semi-finished product 3 is disposed on only one side of the unidirectional fiber reinforced 2.

Figure 1:
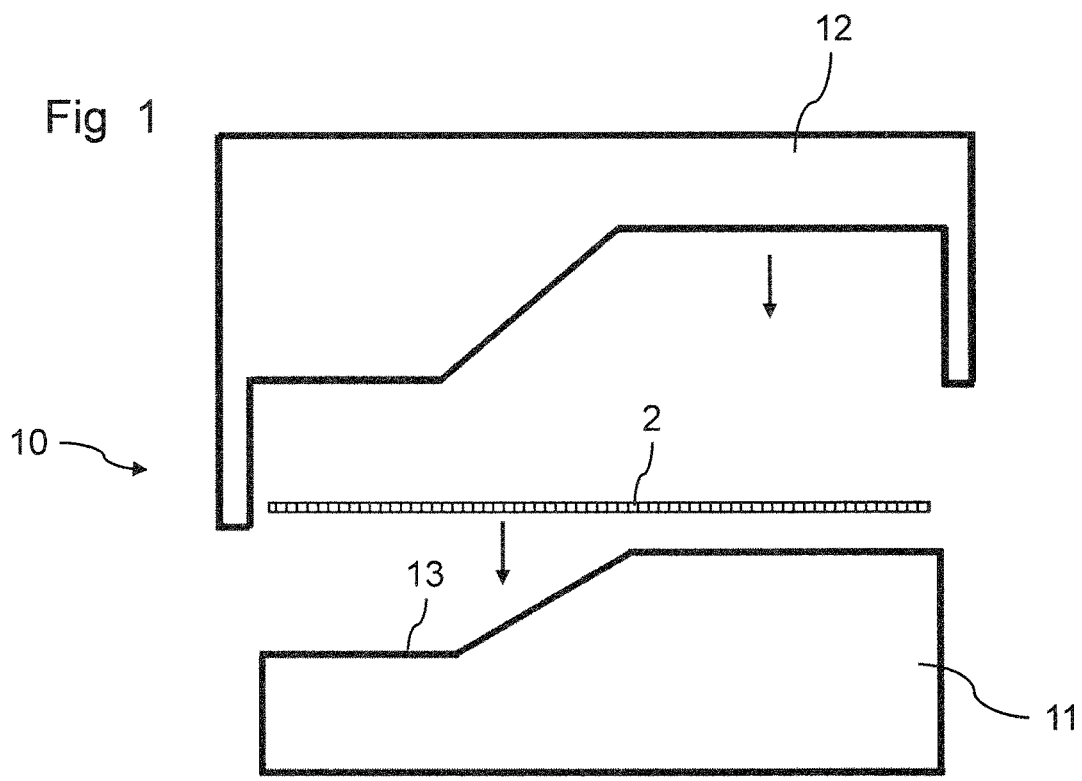
FIG. 1 schematically shows a blank of a unidirectional fiber reinforced, which is placed on the tool surface of a lower part of a preform tool.

FIG. 1 schematically shows a blank of a unidirectional fiber reinforced 2, which is placed on the tool surface 13 of a lower part 11 of a preform tool 10. The unidirectional fiber reinforced 2 is in a level state. The fibers in the blank, which may be, for example, glass fibers, basalt fibers, or else carbon fibers, all have the same orientation. The tool surface 13 of the lower part 11 of the preform tool 10 is double-angled and predefines the desired contour which is to be imparted to the unidirectional fiber reinforced 2.

Figure 2:
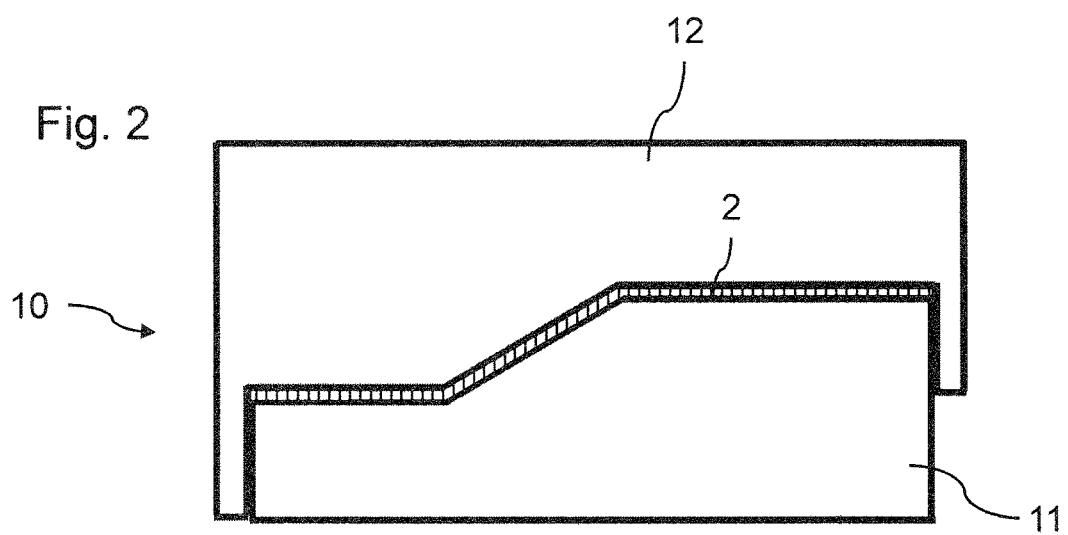
FIG. 2 schematically shows a closed preform tool in which the unidirectional fiber reinforced is shaped and pre-cured.

FIG. 2 schematically shows the preform tool 10 in a closed position in which the unidirectional fiber reinforced 2 is shaped and pre-cured. That is to say that the preform tool 10 according to FIG. 1 is closed, i.e., the preform upper part 12 and the preform lower part 11 of the preform tool 11 are moved together. In the case of the closing procedure, the unidirectional fiber reinforced 2 is shaped under pressure so as to correspond to the contour of the tool surfaces 13 of the lower part 11 and of the upper part 12 of the preform tool 10. Additionally, the unidirectional fiber reinforced 2 in the preform tool 10 is heated by heating and, on account thereof, is pre-cured. The heating temperature is preferably chosen such that the unidirectional fiber reinforced 2 is not cured throughout. Heating of the unidirectional fiber reinforced 2 is preferably performed by heat transfer from the lower part 11 and from the upper part 12 of the preform tool 10 to the unidirectional fiber reinforced 2. Preferably, both the lower part 11 as well as the upper part 12 of the preform tool 10 are heated to a temperature between 120° C. and 130° C. After a predetermined time period has elapsed, the pre-cured unidirectional fiber reinforced 2 is retrieved from the preform tool 10. The dwelling time of the unidirectional fiber reinforced 2 in the preform tool 10 in which the unidirectional fiber reinforced 2 is pre-cured depends on the thickness of the unidirectional fiber reinforced 2. An approximate rule-of-thumb for the dwelling time, or for the heating time, respectively, is half a minute per millimeter of thickness of the fiber reinforced 2. In particular, the heating time also depends on the matrix material used, such as epoxy resin, etc.

After the predetermined time period has elapsed, the structure constructed from the unidirectional fiber reinforced 2 and from the SMC semi-finished product 3 forms an SMC component 1. The component characteristics of the produced SMC component 1 may be designed in a homogenous manner by way of the dual-step production method of the SMC component 1, namely by way of the initial pre-treatment of the unidirectional fiber reinforced 2, and of the subsequent press-molding of the pre-treated unidirectional fiber reinforced 2 with the at least one non-oriented SMC semi-finished product 3. In particular, placing the unidirectional fiber reinforced 2 in the press tool 20 may be controlled in a significantly better manner by way of the pre-treatment of the unidirectional fiber reinforced 2, since the flow behavior of the already treated fibers in the unidirectional fiber reinforced 2 is better adapted to the flow behavior of the non-oriented SMC semi-finished product 3.

Figure 5:
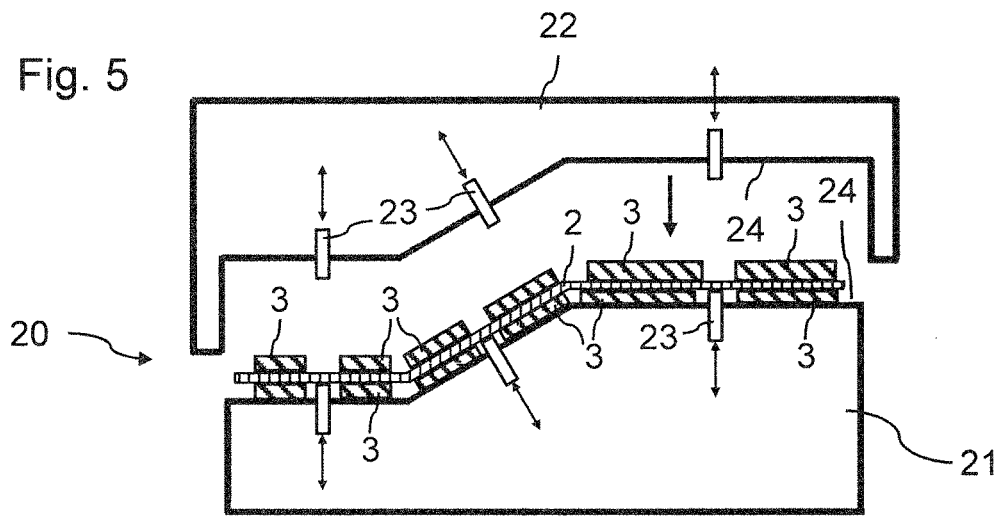
FIG. 5 schematically shows a unidirectional fiber reinforced and a multiplicity of non-oriented SMC semi-finished pieces being brought to bear in a press tool having positioning elements.
Figure 6:
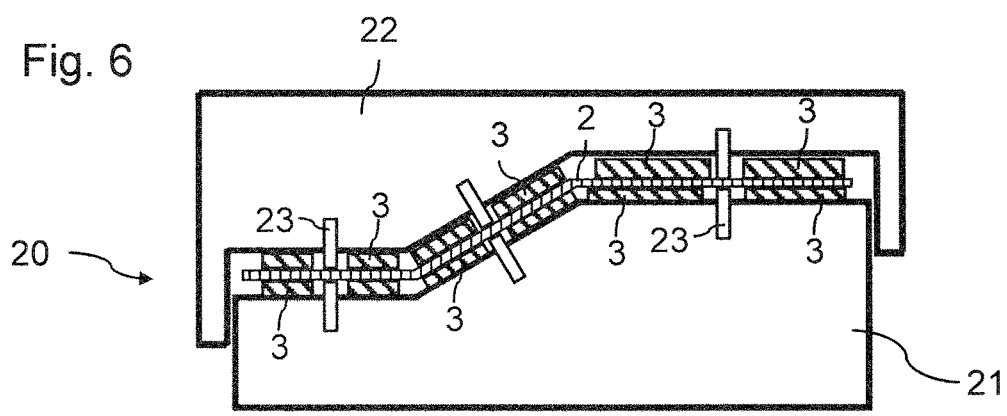
FIG. 6 schematically shows the commencement of press-molding the unidirectional fiber reinforced and the multiplicity of non-oriented SMC semi-finished pieces in the press tool.
Figure 7:
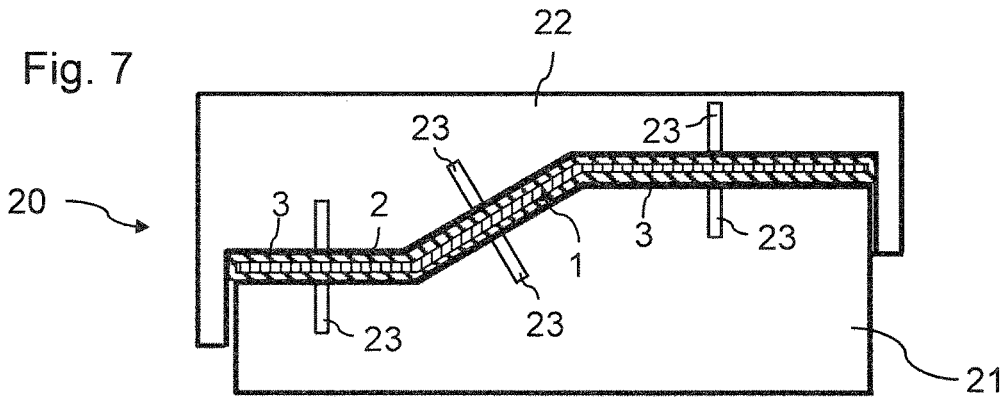
FIG. 7 schematically shows the end of press-molding of the unidirectional fiber reinforced and the multiplicity of non-oriented SMC semi-finished pieces in the press tool, and thus the end of the production of the SMC component.

A further method for producing an SMC component 1 provided with a unidirectional fiber reinforced 2 is shown with respect to FIGS. 5 to 7. In the case of this method, the unidirectional fiber reinforced 2 is completely insert-pressed with SMC semi-finished product 3.

The press tool 20 has deformable positioning elements 23, presently in the form of displaceable pins, in both the press-tool lower part 21 as well as in the press-tool upper part 22. These positioning elements 23 serve for enabling the pre-shaped and pre-cured unidirectional fiber reinforced 2 to be laid up in the press tool 20 at a spacing from the tool surfaces 24 of the press-tool lower part 21 and of the press-tool upper part 22. Since the unidirectional fiber reinforced 2 is to be surrounded on both sides by non-oriented SMC semi-finished product 3, non-oriented SMC semi-finished pieces 3 are first placed between or next to the deployed positioning elements 23, respectively, on the tool surface 24 of the press-tool lower part 21. Subsequently, the pre-treated unidirectional fiber reinforced 2 is brought to bear on the deployed positioning elements 23 of the press-tool lower part 21. Once the unidirectional fiber reinforced 2 has been brought to bear on the positioning elements 23 of the press-tool lower part 21, further non-oriented SMC semi-finished pieces 3 are brought to bear on that side of the unidirectional fiber reinforced 2 that faces the press-tool upper part 22. Herein, gaps between the non-oriented SMC semi-finished pieces 3 are left exposed, so as to enable that the deployed positioning elements 23 of the press-tool upper part 22 may be brought to bear on the unidirectional fiber reinforced 2 when the press tool 20 is being closed. The positioning elements 23 of the press-tool lower part 21 and of the press-tool upper part 22 preferably are mutually adapted in such a manner that each pair of positioning elements 23 is disposed so as to be mutually aligned when the latter bear on the unidirectional fiber reinforced 2.

Once the unidirectional fiber reinforced 2 has been secured in the press tool 20 by the positioning elements 23 of the press-tool lower part 21 and of the press-tool upper part 22, the press tool 20 is closed further, wherein a first press-molding of the non-oriented SMC semi-finished pieces 3 is performed. Subsequently the positioning elements 23 are retracted so far into the press-tool lower part 21 as well as into the press-tool upper part 22 until the end faces of the free ends of the positioning elements 23 come to lie in the plane of the respective tool surface 24 of the press-tool lower part 21, or of the press-tool upper part 22, respectively. Subsequently, the press tool 20 for producing the SMC component 1 is closed further, wherein the non-oriented SMC semi-finished pieces 3 fill the intermediate spaces that have been created by retracting the positioning elements 23. The non-oriented SMC semi-finished pieces 3 and the unidirectional fiber reinforced 2 are interconnected under pressure and heat, so as to produce the SMC component 1. Herein, the heat by way of the press-tool lower part 21 and of the press-tool upper part 22 is transferred to the structure. In order for the SMC component 1 under creation to be completely cured throughout, the press-tool lower part 21 and the press-tool upper part 22 are preferably heated to a temperature of approximately 150° C. The duration of heating again depends on the thickness of the SMC component 1 being created.

In order to obtain better connecting of the non-oriented SMC semi-finished products 3 to the pre-treated unidirectional fiber reinforced 2 during press-molding in the press tool 20, the surface of the unidirectional fiber reinforced 2 may be roughened, in particular by sand-blasting, prior to being placed up in the press tool 20.

LIST OF REFERENCE SIGNS

1 SMC component
2 Unidirectional fiber reinforced
3 SMC semi-finished product
10 Preform tool
11 Lower part of a preform tool
12 Upper part of a preform tool
13 Tool surface
20 Press tool
21 Press-tool lower part
22 Press-tool upper part
23 Positioning element
24 Tool surface The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing an SMC component provided with a unidirectional fiber reinforced, the method comprising the acts of:
    a) placing a blank of the unidirectional fiber reinforced on a tool surface of a lower part of a preform tool;
    b) closing the preform tool by moving together a preform upper part and the preform lower part of the preform tool, wherein the unidirectional fiber reinforced is shaped into a desired shape corresponding to a contour of the tool surface;
    c) pre-curing the unidirectional fiber reinforced in the preform tool by heating, and retrieving the pre-cured unidirectional fiber reinforced from the preform tool after a predetermined time period has elapsed;
    d) laying up the retrieved unidirectional fiber reinforced, having the desired shape, together with the at least one non-oriented SMC semi-finished product on a tool surface of a press-tool lower part in a press tool;
    e) closing the press tool, wherein a press-tool upper part and the press-tool lower part of the press tool are moved together for press-molding the unidirectional fiber reinforced, having the desired shape, and the at least one non-oriented SMC semi-finished product so as to assemble the SMC component, wherein the unidirectional fiber reinforced retains the desired shape in the assembled SMC component; and
    f) curing the assembled SMC component, including the unidirectional fiber reinforced, by heating.

2. The method according to claim 1, wherein in step d), the unidirectional fiber reinforced is first laid up on the tool surface of the press-tool lower part in the press tool, and subsequently the at least one SMC semi-finished product is placed on the unidirectional fiber reinforced.

3. The method according to claim 2, wherein the unidirectional fiber reinforced is held on the tool surface of the press-tool lower part in a form-fitting or a materially integral manner.

4. The method according to claim 1, wherein in step d), the at least one SMC semi-finished product is first laid up on the tool surface of the press-tool lower part in the press tool, and subsequently the unidirectional fiber reinforced is placed on the at least one SMC semi-finished product.

5. The method according to claim 4, wherein at least one further SMC semi-finished product is placed onto that side of the unidirectional fiber reinforced that faces away from the tool surface of the press-tool lower part.

6. The method according to claim 1, wherein a surface of the unidirectional fiber reinforced is treated prior to the unidirectional fiber reinforced being laid up together with the at least one non-oriented SMC semi-finished product in the press tool.

7. The method according to claim 6, wherein the treating is a roughening of the surface.

8. The method according to claim 1, wherein the unidirectional fiber reinforced is held on the press-tool lower part and/or on the press-tool upper part in the press tool by at least one positioning element.

9. The method according to claim 7, wherein at least one positioning element is deployable from the tool surface of the press-tool lower part, and/or at least one positioning element is deployable from the tool surface of the press-tool upper part.

10. The method according to claim 9, wherein:
at least two non-oriented SMC semi-finished products are laid up beside and/or between at least one positioning element on the tool surface of the press-tool lower part in the press tool;
the unidirectional fiber reinforced thereafter is brought to bear on the at least one positioning element and/or on the at least two non-oriented SMC semi-finished products;
at least one further SMC semi-finished product is placed onto the unidirectional fiber reinforced on that side of the unidirectional fiber reinforced that faces away from the tool surface of the press-tool lower part, wherein at least one region of the unidirectional fiber reinforced is not occupied by the at least one further SMC semi-finished product such that at least one positioning element of the press-tool upper part may pass through at the at least one region;
the press tool subsequently is closed to such an extent that the unidirectional fiber reinforced is secured by the positioning elements;
the press tool for partial press-molding of the unidirectional fiber reinforced and of the SMC semi-finished products is closed further after the unidirectional fiber reinforced has been secured;
the positioning elements are retracted up to the tool surface of the respective press-tool parts prior to the desired nominal wall thickness of the SMC component being reached;
the press tool is subsequently closed so far until the desired nominal wall thickness of the SMC component which is created by press-molding the unidirectional fiber reinforced and the SMC semi-finished products is reached; and
the produced SMC component is cured by heating.

11. The method according to claim 8, wherein:
at least two non-oriented SMC semi-finished products are laid up beside and/or between at least one positioning element on the tool surface of the press-tool lower part in the press tool;
the unidirectional fiber reinforced thereafter is brought to bear on the at least one positioning element and/or on the at least two non-oriented SMC semi-finished products;
at least one further SMC semi-finished product is placed onto the unidirectional fiber reinforced on that side of the unidirectional fiber reinforced that faces away from the tool surface of the press-tool lower part, wherein at least one region of the unidirectional fiber reinforced is not occupied by the at least one further SMC semi-finished product such that at least one positioning element of the press-tool upper part may pass through at the at least one region;
the press tool subsequently is closed to such an extent that the unidirectional fiber reinforced is secured by the positioning elements;
the press tool for partial press-molding of the unidirectional fiber reinforced and of the SMC semi-finished products is closed further after the unidirectional fiber reinforced has been secured;
the positioning elements are retracted up to the tool surface of the respective press-tool parts prior to the desired nominal wall thickness of the SMC component being reached;
the press tool is subsequently closed so far until the desired nominal wall thickness of the SMC component which is created by press-molding the unidirectional fiber reinforced and the SMC semi-finished products is reached; and
the produced SMC component is cured by heating.

* * * * *